Feb. 26, 1946.                R. W. OSBORNE                2,395,425
              APPARATUS FOR MEASURING THE QUALITY OF MATERIAL
                     Filed July 31, 1942        3 Sheets-Sheet 1
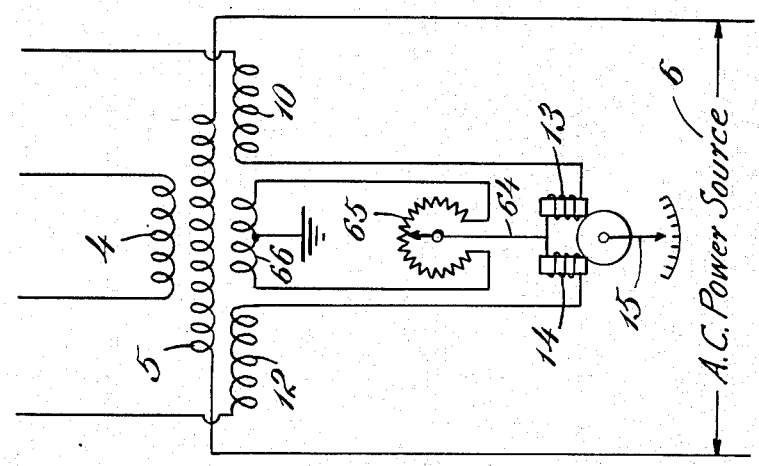
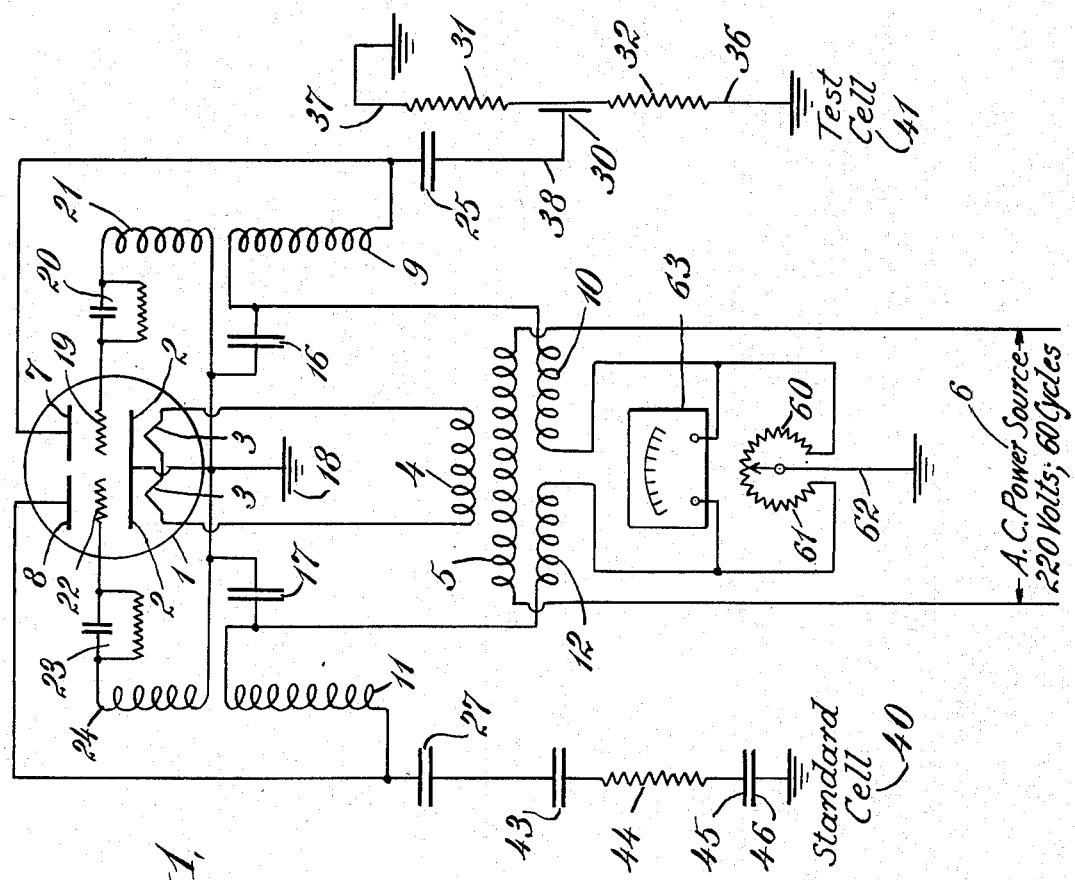
INVENTOR
*Ralph Willoughby Osborne*
BY
*Arvid E. Lyden*
ATTORNEY

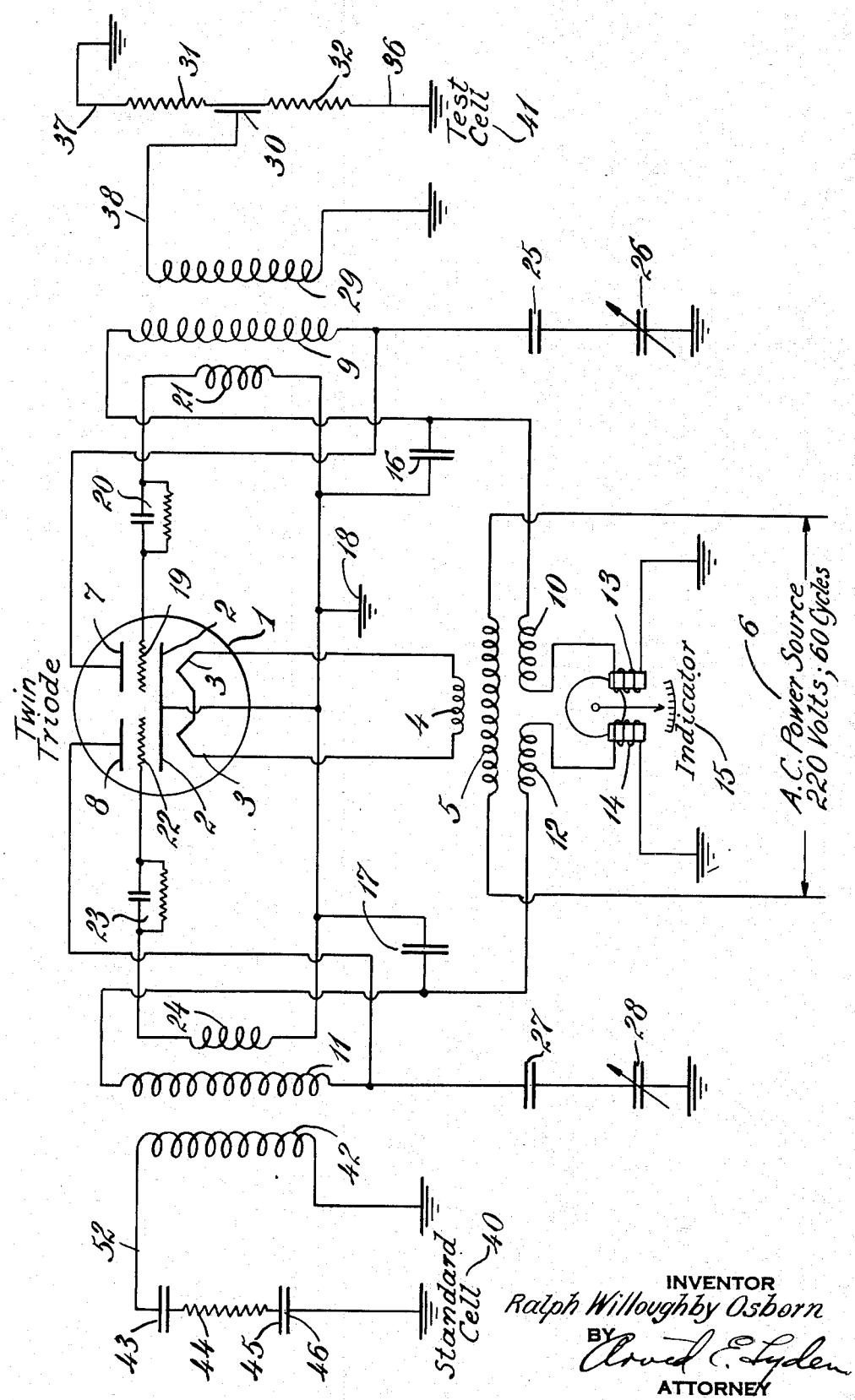

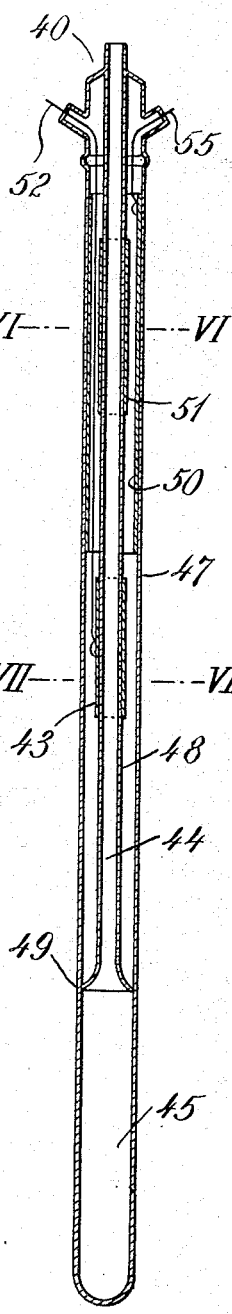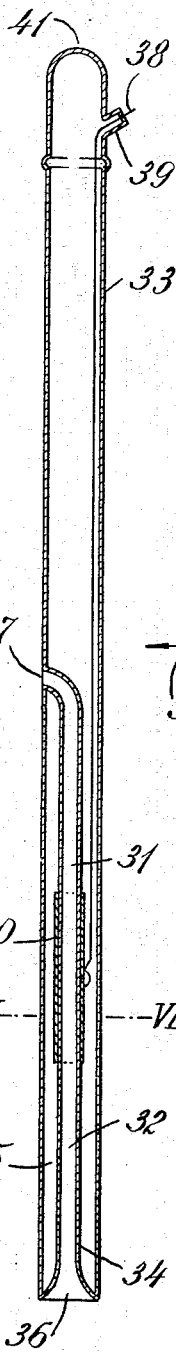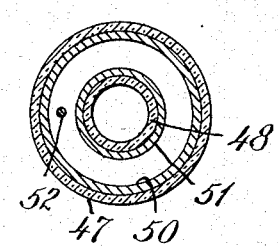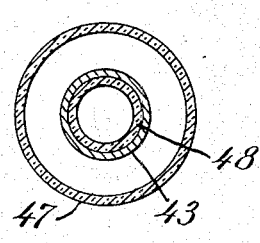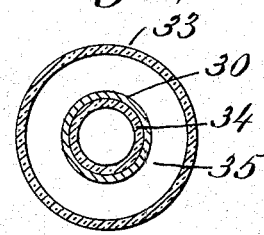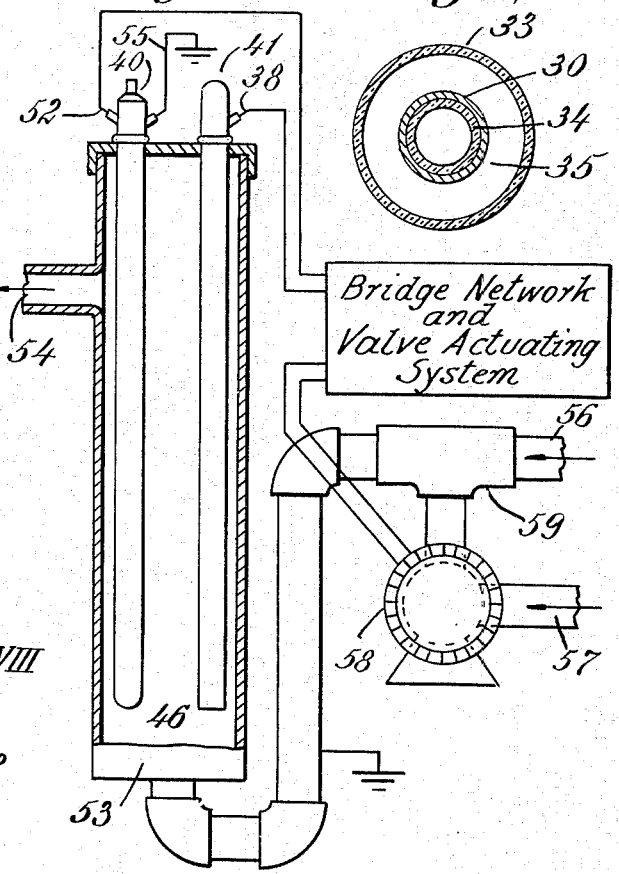

Patented Feb. 26, 1946

2,395,425

UNITED STATES PATENT OFFICE 2,395,425

APPARATUS FOR MEASURING THE QUALITY OF MATERIAL

Ralph Willoughby Osborne, Toronto, Ontario, Canada

Application July 31, 1942, Serial No. 452,994

7 Claims. (Cl. 175—183)

This invention relates to an electrical measuring device. This application discloses and claims an improvement in the electrical control device of my co-pending application Serial No. 289,924, filed August 12, 1939, issued September 29, 1942 as Patent 2,296,867.

In the preparation or processing of materials, for example, in the preparation of chemical products, it is often desired to maintain definite standards of purity or proportioning of ingredients, preferably by some means of continuous automatic control. Many materials, particularly liquids such as sulfuric acid, show variations in electrical characteristics such as conductivity with variations in quality (i. e., concentration), and these electrical characteristics may therefore be employed as a basis for controlling the quality of the material.

It has been proposed heretofore to use the electrical conductivity of a good conducting material such as sulfuric acid as a basis for controlling its quality. Alternating current has generally been used in measuring the conductivity of an electrolyte to avoid the decomposition of material accompanying the passage of direct current therethrough. In order to maintain decomposition at a minimum, it is preferable to employ high frequency alternating current such as is produced by a vacuum tube oscillator circuit for determining variations in electrical characteristics such as conductivity of materials of this type.

Particularly, when conductivity electrodes such as those described in Patent 2,296,867, issued on my co-pending application Serial No. 289,924, filed August 12, 1939, are employed, which electrodes are designed to admit electricity to a liquid for determining its conductivity without having the electrodes in contact with the liquid, so as to avoid attack on the electrodes by a corrosive material such as sulfuric acid, it is important that a high frequency alternating current produced, for example, in a vacuum tube oscillator, be employed to make effective the electrostatic coupling between the electrode and the liquid through the glass wall that shields the electrode from the liquid.

In conductivity measurements heretofore made, both with direct and alternating current, a bridge network such as a Wheatstone bridge has often been employed, whereby the bridge network may be balanced to give a zero reading on an indicator when the material being tested is of the same quality as a standard material, and the variations from this standard in the quality of the material being tested are indicated by a departure of this indicating device from the zero or null point. The indicator thus registers only a differential between the characteristics of the standard side and the test side of the bridge network. This type of measurement, i. e., the null or differential method, is considered desirable in that the device may be so designed that variations in electrical characteristics having no relation to the variation in quality of the material being tested, i. e., due to changes in atmospheric conditions such as temperature, have substantially an equal effect on both sides of the bridge network and accordingly cancel out in their effect on the differential indicator.

When the testing of a corrosive or easily decomposed chemical product makes the use of high frequency alternating current desirable in controlling the quality of the material in accordance with its electrical characteristics, disadvantages are noted in employing a bridge network in which one high frequency circuit associated with the standard material is balanced against another high frequency circuit associated with the material being tested. One disadvantage noted is that the two high frequency circuits, since they are operating simultaneously in close proximity, even though well shielded will interfere to some extent if operated at or near the same frequency, and one of the conditions of obtaining a satisfactory null point and differential reading is that the circuits in balance should be operated at as near the same frequency as possible. Another disadvantage noted when two vacuum tube oscillator circuits are employed in a bridge network is that as the vacuum tubes in each of the circuits age the tube characteristics do not change uniformly throughout the life of the tube so that it is necessary to readjust the null point of the system frequently.

It is an object of this invention to provide a bridge system, comprising two high frequency circuits balanced against each other, suitable for obtaining accurate differential indications of variation from a standard in the quality of a chemical product that is corrosive or is susceptible to electrolytic decomposition.

It is another object of this invention to provide a bridge system comprising two vacuum tube oscillator circuits for controlling the quality of a corrosive or easily decomposed chemical product, in which circuits there are means tending to make the vacuum tube characteristics change with greater uniformity as the tube elements age so that less frequent adjustment of the null point in the bridge network will be necessary.

It is a further object of this invention to provide a new and improved method for controlling the quality, i. e., the concentration, of a corrosive or an electrolytically decomposable material such as sulfuric acid being processed or prepared, whereby accurate differential indications of variations of the processed material from a standard material may be obtained.

I have discovered that in controlling the quality of a material that is corrosive or is susceptible to electrolytic decomposition, when such material is being prepared or processed, on the basis of an electrical characteristic such as conductivity, a bridge network in which two radio frequency alternating current circuits, e. g., oscillator circuits, are balanced against each other may be employed for comparing the material in process with a standard material, and an accurate indication of variations of the process material from the standard material may be obtained, when the bridge network is so energized that the two radio frequency circuits are alternately in operation and a differential comparison of the load on these two circuits is obtained. Alternate operation of the two sides of the bridge network substantially eliminates interference between the two radio frequency circuits. It should be appreciated that at high frequencies interference between the two circuits would otherwise be difficult to eliminate entirely, however well shielded the circuits are.

I have further discovered that when the quality of a corrosive or easily decomposed material is being controlled in a bridge network in which two vacuum tube oscillator circuits are balanced against each other and are alternately excited, as above described, instead of having a separate vacuum tube in each circuit a twin vacuum tube having all the elements of two vacuum tubes in a single envelope may be employed. Such a tube may advantageously be a twin triode type of tube designed so that the twin cathode filaments or cathode heater elements are in series in the tube. In a tube of this type, for example, both sets of elements, being in the same envelope, are operating under precisely equal degree of vacuum and as the tube characteristics change with the aging of the tube the characteristics affecting each of the two circuits in the bridge network tend to change with complete uniformity so that fewer adjustments in the bridge network to compensate for changes in tube characteristics throughout the life of the tube are necessary.

In the accompanying drawings,

Figure 1 is a representation, in the form of a conventional wiring diagram, of a preferred embodiment of my improved bridge network;

Figure 2 shows an alternative hook-up for the balancing and indicating means of the bridge network of Figure 1;

Figure 3 represents still another embodiment of my improved bridge network;

Figures 4 and 5 represent preferred types of conductivity cells for measuring the conductivity of a liquid such as sulfuric acid, Figure 4 showing the cell containing standard acid while Figure 5 shows the cell in which the conductivity of the liquid in process is determined;

Figures 6, 7, and 8 are sectional views along the lines VI—VI, VII—VII, VIII—VIII, respectively, of Figures 4 and 5;

Figure 9 represents a preferred application of my device to the automatic regulation of sulfuric acid concentration.

As above stated, in the device of my invention two radio frequency circuits are in balance in a bridge network. High frequency current is desirable, as above pointed out, both to minimize decomposition of the materials being compared in the bridge network and to make possible the use of electrostatic coupling (for example, through a shielding glass wall) between the material and metal conductors in the circuit, for example, when using the conductivity cells of Patent 2,296,867, issued on my copending application Serial No. 289,924.

There is some exchange of energy, by radiation, whenever two circuits exposed to each other are operating simultaneously on alternating current. The term "radio frequency" is used herein to refer to frequencies at which such exchange of energy, by inductive or capacitative coupling, between two adjacent circuits operating simultaneously might exert an appreciable effect on the characteristics of the circuits. When the frequency of such alternating currents is of the order of several hundred thousand cycles per second and upward, interference between the two high frequency circuits in the bridge network might become a problem if the circuits were in operation simultaneously. For example, I have found serious interference in attempting simultaneous operation of adjacent circuits where I have been employing frequencies of 500,000 to over 3,000,000 cycles per second. Accordingly, my device is of particular importance when such frequencies are employed.

The frequency employed, for example, in measuring the conductivity of a corrosive or electrolytically decomposable material such as sulfuric acid by means of alternating current will depend, in part, on the conductivity of the material. For example, when the conductivity is being measured in a vacuum tube oscillator circuit, as in Figures 1, 2, and 3 of the drawings, care must be taken not to overload the oscillator circuit; i. e., the load carried by the oscillator must be within the capacity of the tube. The load on an oscillator is dependent upon a factor Q which is equal to the reactance of one of the elements of the tank circuit of the oscillator (i. e. either the inductance or capacity) divided by the resistance in that element. The reactance due to either inductance or capacity is dependent upon the frequency. Accordingly, the factor Q, which determines load, depends on both frequency and resistance in the circuit. Therefore, as the control system is applied to materials of varied resistance, it is desirable to vary the frequency of the oscillator also, so as to keep the factor Q, which determines the load on the vacuum tube, substantially constant.

As illustrative, it may be noted that in controlling the concentration of 66° Bé. sulfuric acid, on the basis of its conductivity, frequencies of three to four million cycles have been used, for 99% sulfuric acid slightly more than one million cycles, and for oleum a few hundred thousand cycles. Frequencies of this value are obtained by using vacuum tube radio-frequency oscillators as the high frequency circuits in my bridge network, for example, oscillators of the Hartley or Colpitts type or other feed-back oscillators, dynatron type circuits or other negative-resistance type oscillators, or relaxation type oscillators such as the Van der Pol circuit. Because of its simple design, a reverse feedback type circuit or modification thereof, as shown on the drawings, is preferred.

In accordance with my invention, each of the two high frequency circuits making up the bridge network is intermittently in operation, and the system is so designed that the two high frequency circuits are never in operation simultaneously, but always alternately. The intermittent operation of the two circuits may be accomplished, for example, by using two oscillator circuits to make up the bridge system, and exciting these two circuits by means of a low frequency A. C. source of power, in such a way that each of the two oscillators is excited by the alternate half-cycles of the low frequency A. C. source of power. The frequency of alternate excitation, i. e., the frequency of the A. C. power source used for excitation, should be sufficiently high that an electrical instrument in the excited circuit indicating current, load, or similar circuit characteristic does not show fluctuations corresponding to the alternate periods of operation and non-operation of the circuit, but instead, due to the mechanical inertia of the instrument, gives a steady indication of load or current or similar characteristic in that circuit. Any convenient low frequency, e. g., a commercial A. C. power source within the usual frequency range of 25 to 60 cycles per second, may be employed. I have found it generally practicable to use an exciting current (i. e., A. C. power source) of frequency in the range 25 to 600 cycles per second, though in particular instances frequencies outside this range may be employed. In the embodiment shown in the drawings, the A. C. power source has a frequency of 60 cycles.

This A. C. power source may advantageously be connected to the primary of a transformer which has two oppositely wound secondaries, each of which is arranged to energize one of the oscillator circuits. One end of each of the secondaries, for example, may be grounded, preferably, as shown in Figures 1, 2, and 3 of the drawings, through a variable resistance, or through the coil in an indicator responsive to current or load in that oscillator circuit, or through both an indicator coil and a variable resistance, and the other end of each secondary may be connected to an anode in a vacuum tube, preferably each secondary being connected through an inductance to one of the two plates in a twin triode, as shown in the drawings. When one of the more complex oscillator circuits referred to above is used, tetrodes or pentodes, or twin tubes of these types, may be employed, and an electrode other than the plate may be charged by the A. C. power source. As indicated above, the secondaries are oppositely wound; i. e., going from the ground connection to the anode of the tube, the two secondaries are wound in opposite directions so that each of the two anodes is positively charged on alternate half cycles of the exciting A. C. voltage. Since the oscillator circuit operates only when the plate (or other charged electrode) has a positive charge, it is evident the two oscillator circuits will operate on respective half-cycles of the exciting voltage. When one oscillator circuit is operating and the other is dead, some energy will be transferred by inductive or capacitative coupling to the dead circuit, but since the dead circuit has no exciting current passing through it to operate the indicator, there can be no interference.

When the vacuum tube is of the heated cathode type, as shown in the drawings, the power for the cathode heaters may be derived from an additional secondary winding on the transformer the primary of which is connected to the source of power.

As above indicated, the use of a twin vacuum tube, i. e. a tube in which two complete sets of electrodes are contained within a single envelope, is a feature of my invention. If the two oscillator circuits associated with such a twin vacuum tube were in operation simultaneously at or near the same frequency, the inter-electrode capacities within the twin tube would cause serious interference between the two oscillator circuits. However, since in the bridge system of my invention only one of the oscillator circuits is in operation at any instant, the capacitative coupling between the electrodes of the circuit in operation and the electrodes of the dead circuit does not affect the indicator, as above pointed out; the twin tube construction is therefore practicable in my bridge system. As above pointed out, in a twin type of tube, the tube characteristics of each set of elements change with substantially complete uniformity with aging of the tube; this, of course, is not the case with separate vacuum tubes. Accordingly, with the twin type of tube, little or no adjustment of the network is required during the life of the tube. Since it is important in a control system for comparing the quality of a process material with a standard material that the bridge system should be in constant accurate balance, it is seen that my control system using the twin type of tube is particularly advantageous.

It should be understood, however, that the use of a twin vacuum tube is merely an additional advantageous feature of my invention and that, if desired, separate vacuum tubes may be employed in each oscillator circuit instead of the twin tube. With such a design, alternate excitation of the two oscillator circuits in accordance with my invention would still have the advantage of eliminating interference between the two circuits.

In the bridge network, one of the oscillator circuits has as part of its load a circuit element, the impedance of which depends at least in part upon an electrical characteristic of a standard material with which the material in process is being compared. The other oscillator circuit has as part of its load a circuit element, the impedance of which depends upon an electrical characteristic of the material in process. The circuit element, the impedance of which is dependent upon an electrical characteristic of either the standard or process material, may be a conductor formed of the material, for example, a column of sulfuric acid, as in Patent 2,296,867, issued on my copending case Serial No. 289,924 referred to above, or as in United States Patent 933,015 of August 31, 1909.

The circuit element containing the standard or process material is preferably inserted directly in the oscillatory circuit so that the load on the oscillator circuit depends upon its resistance as a conductor in the oscillator circuit. Such a construction is shown in Figure 1 of the drawings. If desired, however, the standard and process materials may each be contained in separate circuits and each of these separate circuits associated through inductive coupling with one of the oscillator circuits in the bridge network. Such a design is shown in Figure 3 of the accompanying drawings. Another method of associating the circuit elements containing the standard and process materials to the oscillator circuits is by electron coupling, in which case the oscillation frequency will be substantially independent of variations in load. This may be accomplished, for example, by employing tetrodes in the oscillator circuits, using the screen of such tube instead of the plate for connection to the tank circuit of the oscillator, and placing the load in a separate circuit from plate to cathode. However, as above stated, I prefer inserting the elements containing standard or process material as conductors in the plate circuits, as shown in Figure 1 of the drawings.

The circuit element containing the standard material or the material in process, particularly in the case of a conducting liquid such as sulfuric acid, is preferably a core or column of the material acting as a resistance in the circuit containing it, as shown in Patent 2,296,867, issued on my copending application and in Patent 933,015, referred to above. As shown in Patent 2,296,867, issued on my copending application, a corrosive material is shielded from metal elements in the circuit, and the circuit is completed by electrostatic coupling, for example, through a glass wall.

My device is also suitable for controlling the quality of a material in accordance with changes in electrical characteristics other than conductivity. For example, when the material is a nonconductor, the circuit element containing it may be a condenser in which the material is the dielectric. In this case, variation in the quality of the material results in variation in the reactance of the circuit element containing it, which in turn reflects variation in the load on the oscillator circuit in which it is connected. The element containing the process material as dielectric thus acts as a variable condenser in the circuit, while the element containing the standard material as dielectric acts as a fixed condenser. A fixed resistance, which serves to load the oscillator, is advantageously connected in series with such element. In this method of operation, i. e., using the process and standard materials as dielectrics in condenser units, the variations in capacity of the circuit element containing the process material serving as dielectric cause variations in the load on that oscillator, and also cause variations in the frequency of the oscillation.

I have found it advantageous to employ the process and standard materials as conductors in the circuit rather than dielectrics. Further, I have found it advantageous to design the circuits so that the oscillator frequencies remain substantially constant and so that the two circuits in the bridge system operate at or near the same frequency, since change in the frequency of an oscillator circuit affects its sensitivity to change in resistance of the material which is included in that circuit, and precision of temperature compensation depends on equality in sensitivity of the two oscillator circuits.

As above stated, the circuit elements containing the standard and process materials are associated with the two oscillator circuits, preferably by direct connection therein as resistance elements (Figure 1), or, alternatively, through inductive coupling with the oscillator circuits (Figure 3). These circuit elements thus, in either case, provide impedance in the oscillator circuits with which they are associated. Variations in the quality of the process material would therefore cause variations in the impedance provided by the circuit element containing it in its associated oscillator circuit, thus changing the load on this oscillator circuit. The load on the oscillator circuit associated with the element containing the standard material remains substantially constant under constant atmospheric conditions. The load on each of the oscillator circuits may be measured by the current taken by each of these circuits from the source of power.

In order to cancel out the effect of varying loads taken by each circuit due to changing atmospheric conditions such as temperature, which conditions should affect each of the two circuits substantially identically, it is advantageous to get an indication of the difference in load, i. e., difference in current flowing in the two circuits rather than the absolute value of this current in either circuit. Accordingly, it is advantageous to use an indicator responsive to the difference in load on the two oscillators. This may, for example, be a direct current milliammeter with middle zero scale, as shown in Figure 1, connected across corresponding points in the two oscillator circuits so as to show the unbalance due to change in characteristic of product material. Alternatively, the differential indicator may be an instrument containing two coils, each connected in series in one of the oscillator circuits, the two coils tending to produce opposite torques on an element of the indicator; such an instrument is shown in Figures 2 and 3. In this arrangement, the full currents of the oscillator circuits pass through the indicator coils.

The indicator may be adjusted to a null reading at a point where the material in process has a desired quality. It is preferable to employ a standard material having substantially the same quality as that desired in the material in process so that changes in atmospheric conditions such as temperature will have substantially identical effects on the electrical characteristics on the standard material and the material in process and variations in load due to these variations in atmospheric conditions will therefore cancel out in the indicator. Such adjustment (to obtain a null reading) is preferably made by variable resistances associated with the indicator instrument, as shown particularly in Figures 1 and 2, or, alternatively, by variable condensers shunted from each vacuum tube anode to cathode, as shown in Figure 3. Also, where the oscillator circuits involve inductive coupling, as in Figure 3, this coupling may be varied to bring the differential indicator of the bridge system to a null reading. These resistances, condensers, or inductances may also be adjusted to increase the sensitivity of the system to slight changes in quality of the process material.

In the preferred arrangement for obtaining a differential indication of load on the two oscillator circuits and for adjustment of the indicator to a null reading (Figure 1), the transformer secondaries by means of which power is supplied to the two oscillator circuits are grounded through variable resistances and a milliammeter is shunted between the two secondaries at the points of connection to these variable resistances. When the process material is of the desired quality (i. e., concentration) the variable resistances are adjusted to give a zero reading on the milliammeter. As the process material thereafter varies in quality (and the load on the oscillator with which it is associated varies accordingly), the bridge system previously in balance becomes unbalanced and a difference of potential is produced between the ends of the two secondary coils across which the milliammeter is shunted. This difference of potential is shown by a deflection in the milliammeter. This arrangement for indicating differential oscillator load and adjusting the indicator to a null reading is advantageous in that a change in power system voltage does not affect the null reading of the indicator. This arrangement is also advantageous in that a recording apparatus may be substituted for the indicator instrument. Thus, in the arrangement shown in Figure 1 a recording galvanometer may replace the milliammeter. The use of an instrument of the type shown in Figures 2 and 3, in which, as above stated, the full currents of the oscillator circuits pass through the indicator coils may in many instances be considered advantageous since the full use of the available energy of the oscillator circuits makes it unnecessary to use a delicate instrument; i. e., it is possible to use a comparatively inexpensive instrument of rugged construction.

The use of variable resistances or potentiometers associated with the indicator (Figures 1 and 2) I have found to be preferable to the use of variable condensers or variable inductive couplings in the tank circuits of the oscillators (Figure 3) for adjustment of the indicator to a null reading. The arrangements involving variable resistances and potentiometers associated with the indicator do not involve adjustment of elements in the high frequency portion of the oscillators, which would affect the frequency of oscillation. As above stated, change in frequency of an oscillator affects the sensitivity of that oscillator to change in resistance of the product material which is associated with that oscillator circuit and this is undesirable since precision of temperature compensation depends on equality in sensitivity of the two oscillator circuits.

As variations in quality of the process material are shown by the indicator reading, process conditions may be adjusted accordingly to correct the quality of the material. This may also be accomplished automatically. For example, the indicator may contain electrical contacts for actuating process equipment to alter the quality of the material in process in accordance with indications from the control device. In controlling the admixture of water and concentrated sulfuric acid, to produce sulfuric acid of a desired concentration, for example, the above device may be employed, as shown in the drawings, and electrical contacts may be provided on either side of the indicator needle whereby upon deflection of the needle a motor is actuated to open or close a valve controlling the addition of water. The indicator may be designed so that the magnitude of deflection controls the period of operation of a valve-controlling motor, i. e., the extent to which the valve is opened and closed.

In order to avoid "hunting," the actuating apparatus connected to the indicator may be so designed that, after operation of the valve-controlling motor or other adjustment controlling the quality of the material in process, a time lag is introduced whereby a period varying from a few seconds to several minutes will elapse before the indicator will again be effective to actuate the process equipment controlling the quality of the material in process.

The method of controlling the material in process in accordance with my invention thus involves employing the material as part of a circuit element, preferably resistance, such that it forms part of the load of an oscillator circuit. This oscillator circuit is balanced in a bridge network against another oscillator circuit which has as part of its load a circuit element comprising a standard material, preferably of substantially the same quality as the desired quality of the material in process. The circuit elements containing each of these materials, i. e., the standard material and the material in process, are associated each to one of the oscillator circuits, preferably by being directly connected in the oscillator circuits, but in alternative methods by inductive coupling, electrode coupling or other means of association with the oscillator circuits. The two oscillator circuits are excited alternately, the frequency of excitation of each circuit being sufficiently rapid that an instrument indicating current in that circuit, for example, would not pulsate. The frequency of alternate excitation, however, is sufficiently low so that in each excitation there is sufficient time for a large number of oscillations in the circuit being excited. A differential indication of the load on the two oscillator circuits is obtained. As the quality of the material in process departs from the desired standard, the load on its associated oscillator circuit varies, the differential indicator deflects and actuates process equipment for correcting the quality of the material in process to the desired standard. After one actuation of the process equipment for correcting the quality of the material in process, a time lag of from a few seconds to several minutes is preferably introduced before another actuation of the process equipment is possible.

On the accompanying drawings, there are shown for purposes of illustration preferred embodiments of my invention. It will be noted that the several elements of the illustrated device, as they appear in various figures of the drawings, may be represented diagrammatically either in their actual physical form or in the form of their equivalent electric circuit elements. So far as possible, the same reference character has been employed for each of the elements throughout the various figures of the drawings, in whatever form the element is represented.

Reference numeral 1 indicates a twin triode of the heated cathode type. This tube has twin cathodes 2, 2 with a common connection in the base of the tube; these cathodes are heated by the twin heater circuits 3, 3 in series which derive their power from an auxiliary low-voltage secondary winding 4 in a transformer, the primary winding 5 of which is connected to an A. C. power source of 220 volts, 60 cycles, indicated at 6. The twin triode 1 has two plates 7 and 8, each of which is connected to the resonant tank circuit of an oscillator circuit. Plate 7 is connected through an inductance 9 to a secondary winding 10 in the transformer having the primary winding 5. The plate 8 of the twin triode 1 is connected through the inductance 11 to the secondary winding 12 of the transformer which has the primary winding 5. The other ends of secondary windings 10 and 12 are connected to ground through the two arms 60 and 61, respectively, of a potentiometer, the variable contact 62 of which is connected to ground. Progressing from plate to ground, the secondary windings 10 and 12 are in opposite directions; accordingly, plates 7 and 8 are positively charged on alternate half-cycles of the A. C. power source 6.

The plate circuit of plate 7 includes in addition to the inductance 9 a condenser 16 which completes this plate circuit to the cathode 2 of vacuum tube 1. The plate circuit of plate 8 in addition to inductance 11 includes a condenser 17 which completes this circuit to the cathode 2 of vacuum tube 1. Cathodes 2, 2 are grounded as indicated at 18. In the vacuum tube the grid 19 is associated with plate 7, and the grid 22 with plate 8. The circuit of grid 19 includes in series the grid leak and condenser 20 and the coil 21 completing the circuit to the cathode 2. The circuit of grid 22 includes in series the grid leak and condenser 23 and coil 24 completing the circuit to the cathode 2. The coils 21 and 24 in the grid circuits are inductively coupled to the induction coils 9 and 11 in the plate circuits so as to provide a feed-back to the grid from the plate circuit as is common in oscillator circuits of the reverse feed-back type.

Each of the oscillator circuits has an additional load due to auxiliary circuit branches containing conductivity cells, one such circuit branch being connected in parallel to each of the plate circuits described above. Thus a circuit branch made up of a condenser 25 and in series therewith a test conductivity cell 41 is connected in parallel with the inductance 9 and condenser 16 to form the complete plate circuit based on plate 7. Similarly, the condenser 27 and in series therewith the standard conductivity cell 40 constitute a circuit branch connected in parallel with the inductance 11 and condenser 17 to form the complete plate circuit based on plate 8. As shown in Figure 1, in each case connection of the conductivity cell circuit branch to the cathode of the vacuum tube is completed through ground.

The condensers 25 and 27 are placed in the circuit to guard against the possibility of an accidental ground on windings 9 and 11 which are connected to the transformer windings 10 and 12, the voltage of which will usually be of the order of 250 volts.

The physical form of the conductivity cell 41 containing the elements 30, 31 and 32 is the same as that described in Patent 2,296,867, issued on my copending case Serial No. 289,924. The construction of this cell can be better understood by reference to Figures 5 and 8 in which 33 indicates an outer glass tube closed at the top, and at the bottom sealed to an inner glass tube 34 so as to form a closed annular space 35 between the tubes 33 and 34 while leaving the inner tube open at its lower end 36. At its upper end 37, the inner tube bends and passes out through the side wall of the tube 33. The end 37 of tube 34 is also open. The condenser plate 30 is in the sealed annular space 35 surrounding a midportion of the outer wall of the inner tube 34. A wire 38 is connected to the plate 30 and passes out of the tube 33 through the sealed nipple 39. A condenser in the conductivity cell circuit is thus formed by the plate 30, electrostatically coupled to the midpoint of the column of acid in the tube 34, through the glass wall of the tube 34. The resistances 31 and 32 shown in Figure 1 are the portions of the acid column (in tube 34) labelled 31 and 32 in Figure 5. Each of these portions of acid column joins the main body of acid 46 at 37 and 36, respectively. This main body of acid is grounded.

The test cell 41 thus includes as circuit elements a condenser formed by a plate 30 and a column of sulfuric acid in process serving as the other side of the condenser, and connecting this condenser to ground (and thus to the cathode of the vacuum tube) two circuit branches 31 and 32 containing resistances formed by the portions of the acid column extending away from the condenser plate 30.

The construction of the standard conductivity cell is also the same as that shown in Patent 2,296,867, issued on my copending case Serial No. 289,924. The construction of this cell may be better understood by reference to Figures 4, 6, and 7 in which 47 represents the outer glass tube of the conductivity cell 40. This tube is closed at both ends. Within tube 47 is an inner glass tube 48 extending only part of the length of tube 47, being sealed to the inner wall of tube 47 at 49, so as to form a closed annular space between tubes 47 and 48 while leaving tube 48 open to the portion of tube 47 lying below 49. In this annular space is the metal plate 43 arranged to surround the midportion of the outer surface of the inner tube 48. Inside the glass tube 48 is a column of standard acid. At its lower end the tube 48 expands and merges, as above described, at the point 49 with the outer tube 47, and the column of standard acid accordingly is separated from the outside at this point only by the single glass wall of the outer tube 47. The column of standard acid 44 thus, at its midpoint, forms a condenser with the metal plate 43, and at its lower end 45 forms another condenser with the grounded body of acid 46 which surrounds the conductivity cell 40.

The cell 40 thus includes in series a condenser, one side of which is a metal plate 43 and the other side of which is a column of standard acid separated from the metal plate by a glass wall which forms the dielectric for the condenser. The column 44 of the standard acid extending away from the plate 43 constitutes a resistance in series with the condenser 43. This column of liquid 44 at a point 45 remote from the condenser plate 43 is separated by a glass wall from the grounded body of process acid 46 in which cell 40 is immersed. The acid bodies 45 and 46 thus constitute the two sides of a condenser in which the glass wall is the dielectric. Since the body of acid 46 is grounded, the circuit is complete to the cathode of the vacuum tube, which is grounded. The wire 52 connects the condenser plate 43 to the condenser 27 of Figure 1.

The conductivity cell 40 contains additional electrodes whose purpose is to compensate for stray capacity effects that might be introduced by variations in the upper level of the liquid column 44 due to thermal expansion, by formation of a conducting liquid film along the glass surface above the level of the liquid, and possibly by the accumulation of condensed moisture or acid in the upper air spaces within the tube. These compensating means are fully described in Patent 2,296,867, issued on my copending case Serial No. 289,924. Electrode 50, grounded by means of wire 55, is a cylinder of wire mesh or metal plate and is positioned on the inner surface of the outer glass tube 47 at its upper end. Another metal electrode 51 is arranged to surround the outer surface of the inner glass tube 48 at its upper end. The level of the standard acid is arranged to remain within the area surrounded by the electrode 51.

The conductivity cells 40 and 41 are positioned side by side in an enlarged section of the pipe through which the process acid flows. This is shown in Figure 9 where the process acid, the concentration of which it is desired to control, enters the enlarged section where the conductivity cells are placed at 53 and leaves at 54. The process acid thus flows through the inner tube 34 of the test cell 41, entering this tube at 36 and leaving at 37, to form the resistances 31 and 32, and to form the condenser with plate 30; the process acid also surrounds the lower portion of the standard conductivity cell 40 to form one side of one of the condensers in the standard cell circuit. This body of process acid 46 surrounding the standard cell and flowing through the test cell is grounded through contact with the grounded pipe through which it flows. The wire 52 from the standard cell 40 and the wire 38 from the measuring cell 41 are connected to the bridge network, as shown in the wiring diagram of Figures 1 and 3, and as indicated in Figure 9.

The transformer secondary 10 thus excites the oscillator circuit with which the test conductivity cell is associated while the transformer secondary 12 excites the oscillator circuit with which the standard conductivity cell is associated. As above pointed out, these circuits are alternately excited. As shown in Figure 1, a direct current milliammeter 63 with middle zero scale is shunted between the ends of coils 10 and 12 and a potentiometer or variable resistance having the two variable arms 60 and 61 in series is also connected between these ends of coils 10 and 12. The resistance arms 60 and 61 are varied by a movable contact 62 which is grounded.

Coils 10 and 12 are generally of identical design. Therefore, if both oscillator circuits take the same current, the milliammeter may be brought to a zero reading by connecting the center of the variable risistance to ground. When the currents in the two oscillator circuits are not the same, the milliammeter may be brought to a zero reading by proper adjustment of the movable contact 62 in the variable resistance. The bridge system of Figure 1 may thus be initially adjusted to the null reading of the indicator 63 while sulfuric acid of the desired concentration is in the test cell 41. Thereafter, as the process acid departs from this desired concentration, the resistances 31 and 32 will change and the current taken by the oscillator circuit with which they are associated will change accordingly. This change in current in the oscillator circuit will cause deflection of the needle in indicator 63.

The indicator shown in Figures 2 and 3 of the drawings is of the type described in Patent 2,296,867, issued on my copending application Serial No. 289,924. It is an induction type of instrument containing a disc, preferably of aluminum, which has its periphery slightly eccentric to the shaft and is positioned in the fields of the two coils 13 and 14 in such a way that these coils, when current flows through the oscillating circuits containing them, produce torques tending to turn the disc in opposite directions. A pointer and scale may be employed, as shown in the drawings, to indicate the differential torque on the disc, which differential also indicates the difference in load on the two oscillator circuits.

In the design shown in Figure 2, the coil 4 is connected to cathode heaters in a vacuum tube as in Figure 1, and the coils 10 and 12 excite oscillator circuits of the precisely same design shown in Figure 1. These oscillator circuits have conductivity cells associated therewith just as in Figure 1. The secondary coil 10 which excites the oscillator circuit based on plate 7 is connected in series with the coil 13 of the indicator, while the secondary coil 12 which excites the oscillator circuit based on plate 8 is connected in series with the coil 14 of the indicator. The other ends of coils 13 and 14 have a common connection 64 which is a movable contact point in a potentiometer 65. This movable contact point is generally at approximately the point of zero potential in the potentiometer. The potentiometer 65 is energized by an additional secondary coil 66 coupled to the transformer primary 5. The center point of coil 66 is grounded.

Thus, if the oscillators energized by coils 10 and 12, respectively, are taking the same current, the indicator 15 may be brought to a zero reading by placing the movable connection 64 in the potentiometer at the point of zero potential which would be the center of the potentiometer, if of symmetrical design.

In the operation of the bridge system of Figure 2, the desired standard acid and the desired quality of process acid are placed in the two conductivity cells 40 and 41. The movable connection 64 in the potentiometer 65 is then adjusted to obtain a zero reading on the indicator 15. Thereafter, as the concentration of process acid departs from the desired concentration, this departure will vary the current taken by the oscillator circuit based on coil 10 which in turn will vary the torque by coil 13 and thus cause a deflection in the indicator 15.

In the design shown in Figure 3 of the drawings, the conductivity cells are not directly connected as circuit branches in parallel with the plate circuits of the oscillators. Instead, each conductivity cell is contained in an auxiliary circuit which is inductively coupled to one of the oscillator circuits. Thus the auxiliary circuit containing the test conductivity cell is made up of a coil 29 loosely coupled to coil 9 of the oscillator circuit on that side, and in series with the coil 29 is connected the test conductivity cell 41, the connection between cell 41 and coil 29 being completed through ground. The auxiliary circuit containing the standard conductivity cell 40 includes in series the cell 40 and coil 42 loosely coupled to the inductance 11 of the oscillator circuit on that side, the circuit between coil 42 and cell 40 being completed through ground.

Thus, part of the impedance of each oscillator circuit is due to the auxiliary circuit coupled thereto and the amount of impedance reflected into the oscillator circuit by its associated auxiliary circuit depends upon the impedances in the auxiliary circuit. Thus the impedance in the oscillator circuit based on plate 7 (and accordingly the current taken by this circuit) depends in part upon the resistances 31 and 32 of the test conductivity cell contained in the auxiliary circuit inductively coupled to the oscillator circuit of plate 7 and as the resistances 31 and 32 change with variation in concentration of the sulfuric acid, this change will be reflected as a change in impedance in the associated oscillator circuit and the current taken by this oscillator circuit will vary in turn. As the current in the oscillator circuit varies, the torque exerted by coil 13 will vary and the needle in indicator 15 will be deflected.

In the design shown in Figure 3, the indicator is brought to a zero reading when sulfuric acid of the desired concentration is in the conductivity cell 41 by adjustment of variable capacities in the high-frequency portion of the oscillator circuits. Thus, in the design shown in Figure 3 of the drawings, plate 7 is connected to the cathode by a second plate circuit containing the fixed condenser 25 and the variable condenser 26 in series, and plate 8 is connected to the cathode through an additional plate circuit containing the fixed condenser 27 and the variable condenser 28 in series. Through adjustment of the variable condensers 26 and 28, the two oscillator circuits based on plates 7 and 8, respectively, may be balanced to give a zero reading on the indicator. Further, by the proper adjustment of condensers 26 and 28, the sensitivity of the bridge network formed by the two oscillator circuits may be increased.

As indicated above, electric contacts may also be provided, positioned to be contacted by a member attached to the indicator, whereby process equipment, e. g., a motor attached to a valve controlling the proportion of ingredients that make up the process material, as shown in Figure 9 of the drawings, may be actuated in accordance with deflections of the needle in the indicator. In the construction shown in Figure 9, concentrated acid enters at 56 and water for diluting this acid to a desired concentration enters at 57. These ingredients are thoroughly mixed in mixing chamber 59. 58 indicates a valve connected to a motor armature for controlling the proportion of water entering the sulfuric acid. This motor may be actuated by a valve actuating circuit which is responsive to the bridge network indicator, and as above stated the valve actuating circuit may include means providing a time lag after each successive actuation of the valve to permit time for the conductivity cells to reflect accurately the altered concentration of the acid due to the opening or closing of the valve. The time lag obviates "hunting" by the control system.

The operation of the device illustrated in the drawings has been substantially covered in the above description. By means of this device, which as above stated is intended for the control of sulfuric acid concentration in a process where water is admixed with a concentrated acid for the production of a more dilute acid of controlled concentration, the proportion of water added to the concentrated acid may be automatically regulated as above described. However, instead of automatic regulation, the valve actuating circuit referred to above and indicated in Figure 9 of the drawings may, if desired, be omitted and the water valve controlled manually in accordance with the readings either visually noted or recorded on the indicator of the bridge network.

It should be evident my device and method are not limited to the control of sulfuric acid or other liquid concentration in accordance with conductivity measurements. My device and method may be applied to controlling the quality of any desired material which is in the course of preparation or processing, in accordance with some electrical characteristic of the material. As above stated, in controlling the quality of the material in accordance with its electrical properties, it is most advantageous to use an electrical bridge network where the material in process may be compared with a standard material, and a differential indication of variations of the process material from the standard material may be obtained. As further stated above, it has been found advantageous in determining an electrical characteristic of a corrosive chemical product, or a material subject to electrolytic decomposition, to employ high frequency alternating currents, both for minimizing electrolytic decomposition of the material and in order to make it possible to maintain metallic circuit elements such as electrodes out of contact with the material. My device and method therefore are of great advantage in controlling the quality of such materials, where the use of two high frequency alternating current circuits in a bridge network is desired.

Since certain changes in the constructions and process set forth above, which embody the invention, may be made without departing from its scope, it is intended that all matter contained in the above description or shown in the accompanying drawings shall be interpreted as illustrative and not in a limiting sense.

I claim:

1. A device for determining the quality of a material in process relative to a standard material by comparing electrical characteristics of the process material and the standard material, said device comprising two radio frequency alternating current circuits, means for energizing each of the two circuits alternately so as to maintain a radio frequency current in only one circuit at a time, a circuit element including a sample of the process material associated with one of the radio frequency alternating current circuits so as to consume a part of the energy in that circuit which is dependent upon the said electrical characteristic of the process material, a circuit element including a sample of the standard material associated with the second of the radio frequency alternating current circuits so as to consume a part of the energy in the said second circuit which is dependent upon the said electrical characteristic of the standard material, an electrical instrument associated with the two radio frequency alternating current circuits for alternate energization of the instrument by each circuit in proportion to the above described consumption of energy by the said circuit element in that circuit, and an element in said electrical instrument tending to respond oppositely to said energization of the instrument by each of the two radio frequency circuits, said element having a time lag in said response sufficiently greater than the period of alternate energization by the two radio frequency circuits that the resultant response of said element indicates an average difference between the energization of the electrical instrument by the two radio frequency circuits.

2. A device for determining the quality of a material in process relative to a standard material by comparing electrical characteristics of the process material and the standard material, said device comprising two radio frequency alternating current circuits, means for energizing each of the two circuits alternately so as to maintain a radio frequency current in only one circuit at a time, said means alternating the operation of the two circuits at a frequency of at least about 25 cycles per second, a circuit element including a sample of the process material associated with one of the radio frequency alternating current circuits so as to consume a part of the energy in that circuit which is dependent upon the said electrical characteristic of the process material, a circuit element including a sample of the standard material associated with the second of the radio frequency alternating current circuits so as to consume a part of the energy in the said second circuit which is dependent upon the said electrical characteristic of the standard material, an electrical instrument associated with the two radio frequency alternating current circuits for alternate energization of the instrument by each circuit in proportion to the above described consumption of energy by the said circuit element in that circuit, and an element in said electrical instrument tending to respond oppositely to said energization of the instrument by each of the two radio frequency circuits, said element having a time lag in said response sufficiently greater than one twenty-fifth of a second that the resultant response of said element indicates an average difference between the energization of the electrical instrument by the two radio frequency circuits.

3. A device for determining the quality of a material in process relative to a standard material by comparing electrical characteristics of the process material and the standard material, said device comprising two radio frequency alternating current circuits, means for energizing each of the two circuits alternately so as to maintain a radio frequency current in only one circuit at a time, said means alternating the operation of the two circuits at a frequency of at least about 25 cycles per second, a circuit element including a sample of the process material associated with one of the radio frequency alternating current circuits so as to consume a part of the energy in that circuit which is dependent upon the said electrical characteristic of the process material, a circuit element including a sample of the standard material associated with the second of the radio frequency alternating current circuits so as to consume a part of the energy in the said second circuit which is dependent upon the said electrical characteristic of the standard material, an electrical instrument associated with the two radio frequency alternating current circuits for alternate energization of the instrument by each circuit in proportion to the above described consumption of energy by the said circuit element in that circuit, an element in said electrical instrument tending to respond oppositely to said energization of the instrument by each of the two radio frequency circuits, said element having a time lag in said response sufficiently greater than the period of alternate energization by the two radio frequency circuits that the resultant response of said element indicates an average difference between the energization of the electrical instrument by the two radio frequency circuits, and means for adjusting the reading of the electrical instrument to a null point when the material in process is of a desired quality, without affecting the frequency of either of said radio frequency circuits.

4. A bridge system for determining the quality of a material in process relative to a standard material by comparing electrical characteristics of the process material and the standard material, comprising two oscillator circuits, with one of which a sample of the process material is associated to furnish an impedance and to consume a part of the energy of said oscillator circuit which is dependent upon the said electrical characteristic of said process material, and with the other of which is associated a sample of the standard material to furnish an impedance and to consume a part of the energy of said oscillator circuit which is dependent upon the said electrical characteristic of said standard material, means for energizing each of the two circuits alternately so as to produce and maintain a radio frequency current in only one circuit at a time, and an electrical instrument associated with the two oscillator circuits for alternate energization of the instrument by each circuit during the time the radio frequency current is flowing in said circuit, said energization being in proportion to the above described consumption of energy by the material associated with said circuit, and said instrument tending to respond oppositely to the said energizations of the instrument by each of the two oscillator circuits and having a time lag in such response sufficiently greater than the period of alternate enerization of the two oscillator circuits that the resultant response of said instrument indicates an average difference between the energization of the instrument by each of the oscillator circuits.

5. A bridge system for determining the quality of a liquid in process relative to a standard liquid by comparing the electrical conductivity of the liquid in process with the conductivity of the standard liquid, comprising two oscillator circuits the electrodes of which are contained in a twin thermionic tube comprising a cathode common to both circuits, means for energizing each of the two oscillator circuits alternately so as to maintain a radio frequency current in only one circuit at a time, an auxiliary circuit comprising a column of the process liquid as a resistance element in the circuit, this auxiliary circuit being inductively coupled to one of the oscillator circuits to furnish an impedance and to consume a part of the energy of said oscillator circuit which is dependent upon the conductivity of the column of process liquid, a second auxiliary circuit comprising a column of standard liquid as a resistance element in the circuit, this second auxiliary circuit being inductively coupled to the second of the oscillator circuits to furnish an impedance and to consume a part of the energy in said oscillator circuit which is dependent upon the conductivity of the column of standard liquid, and an electrical instrument associated with the two oscillator circuits for alternate energization by each of the two oscillator circuits during the time the radio frequency current is flowing in that circuit, said energization being in proportion to the above described consumption of energy in said circuit, said instrument tending to respond oppositely to said energizations by each of the two oscillator circuits and having a time lag in said response sufficiently greater than the period of alternate energization of the two oscillator circuits that the resultant response of said instrument indicates an average difference between the energization of the instrument by each of the two oscillator circuits.

6. A bridge system for determining the quality of a material in process relative to a standard material by comparing electrical characteristics of the material in process and the standard material, comprising two oscillator circuits in one of which a sample of the process material furnishes impedance and consumes a part of the energy in said circuit which is dependent upon its said electrical characteristic and in the other of which a sample of the standard material furnishes impedance and consumes a part of the energy in said circuit which is dependent upon its said electrical characteristic, means for energizing each of the two oscillator circuits alternately so as to maintain a radio frequency current in only one circuit at a time, said means alternating the operation of the two circuits at a frequency in the range of about 25 to 600 cycles per second, an electrical instrument connected to the two oscillator circuits for alternate energization by each of the two oscillator circuits during the time the radio frequency current is flowing in that circuit, said energization being in proportion to the above described consumption of energy in said circuit, and an element in said instrument tending to respond oppositely to said energizations by each of the two oscillator circuits and having a time lag in said response sufficiently greater than one twenty-fifth of a second that the resultant response of said element indicates an average difference between the reaction of the element to each of said energizations of the instrument.

7. In a bridge network for determining the quality of a liquid in process relative to a standard liquid by comparing the electrical conductivity of the liquid in process with the conductivity of the standard liquid, two reverse feedback oscillator circuits, the electrodes of which are contained in a twin triode comprising a heated cathode common to both circuits and separate grids and plates for each circuit, the two oscillator circuits having approximately the same frequency of oscillation, means for energizing each of the two circuits alternately, said means including a source of low frequency alternating current of frequency in the range of about 25 to about 600 cycles per second, to produce and maintain a radio frequency current in each of the two oscillator circuits on the alternate half-cycles of the low frequency alternating current, a standard conductivity cell connected to furnish impedance and consume a part of the energy in a branch of the plate circuit of one of the oscillator circuits, said cell containing a column of standard liquid electrostatically coupled to a conductivity electrode positioned adjacent to the liquid column but separated therefrom by a non-conducting wall, a test conductivity cell connected to furnish impedance and consume a part of the energy in a branch of the plate circuit of the second of the oscillator circuits, this test conductivity cell containing a stream of liquid in process electrostatically coupled to a conductivity electrode positioned adjacent to the stream of process liquid but separated therefrom by a non-conducting wall, an electrical instrument associated with the two oscillator circuits for alternate energization by each of the two oscillator circuits during the time a radio frequency current is flowing in that circuit, said energization of the instrument by each of said oscillator circuits being in proportion to the above described consumption of energy in that circuit, an element in said instrument tending to respond oppositely to said energization by each of the two oscillator circuits, said element having a time lag in said response sufficiently greater than one twenty-fifth of a second that the resultant response of said element indicates an average difference between the reaction of the element to each of the energizations of the electrical instrument, and a potentiometer associated with said electrical instrument to adjust said instrument to a null reading when the liquid in process is of the desired concentration, without affecting the frequency of the oscillator circuits.

RALPH WILLOUGHBY OSBORNE.